United States Patent [19]

Araki

[11] Patent Number: 4,566,128

[45] Date of Patent: Jan. 21, 1986

[54] METHOD FOR DATA COMPRESSION FOR TWO-VALUE PICTURE IMAGE

[75] Inventor: Shuichi Araki, Kyoto, Japan

[73] Assignee: Dainippon Screen Seizo Kabushiki Kaisha, Japan

[21] Appl. No.: 514,674

[22] Filed: Jul. 18, 1983

[30] Foreign Application Priority Data

Sep. 13, 1982 [JP] Japan ................. 57-159225

[51] Int. Cl.$^4$ ............................................. G06K 9/48
[52] U.S. Cl. ...................................... 382/56; 358/260; 382/60
[58] Field of Search ............... 358/133, 138, 260, 261, 358/263; 382/22, 56, 54, 60; 364/518; 340/750, 798–801

[56] References Cited

U.S. PATENT DOCUMENTS

| | | | |
|---|---|---|---|
| 4,150,401 | 4/1979 | Yamamoto et al. | 358/260 |
| 4,355,337 | 10/1982 | Sekigawa | 358/260 |
| 4,365,273 | 12/1982 | Yamada et al. | 358/260 |
| 4,375,654 | 3/1983 | Evans et al. | 358/260 |
| 4,409,623 | 10/1983 | Kobayashi et al. | 358/260 |

Primary Examiner—Leo H. Boudreau
Attorney, Agent, or Firm—Hayes, Davis & Soloway

[57] ABSTRACT

A method for compressing the data of character images primarily for a font set for kanji (Chinese character) photo-type-setting characterized by the steps of dividing up an original picture image into a plurality of partial picture images, identifying the contour lines in each of the partial picture images by finding a start point and an end point for each of the contour line segments as well as those points which characterize the configuration of each contour line segment, connecting the start points with the corresponding end points so as to determine a group of closed-loop line segments as an aggregate of the contour lines and to represent the original picture image, and storing the date of this original picture in the form of a group of closed-loop line segments in a memory in a highly compressed form through elimination of coordinate point data which may be identified by less redundant information.

3 Claims, 6 Drawing Figures

FIG. I

METHOD FOR DATA COMPRESSION FOR TWO-VALUE PICTURE IMAGE

This invention relates to a method for compressing data of a two-value picture image and, in particular, to a method for compressing digital data for character font in computerized photo-type-setting.

In computerized photo-type-setting, it is desirable to have various font sets such as Ming-type, gothic and so on in the case of kanjis (Chinese characters) in memory in readily retrievable manner. Also, to meet the need for high quality, the bit pattern of each character must be comprised of an extremely dense dot matrix, as opposed to the case of character patterns for common kanji processors.

It thus gives rise to the problem of the need for an extremely large memory device when one tries to store a number of character patterns on the order of at least several thousand as character data which accurately represent the original character patterns.

There have been proposed various methods for compressing character data instead of simply storing each character as a simple dot matrix and most of them were based on the bandwidth compression techniques developed in the field of image transmission technology.

However, the achievements so far made are by no means impressive. For instance, the known run-length method can only achieve a compression ratio of 20 to 30%. And the vector method which can achieve a compression ratio on the order of a few percent required so much manual work that it is almost inapplicable to computer-controlled photo-type-setting.

As a break-through in this technical field, the Inventors disclosed a data compression method in U.S. Pat. application No. 440,559 (which corresponds to Japanese Patent Application No. 56-180649 filed on Nov. 11, 1981, now U.S. Pat. No. 4,524,456, as a solution to the above-mentioned problem, which can provide an improved compression ratio over the conventional run-length method or the vector method, facilitating the filing of two-value picture images and allowing substantial reduction in the necessary memory capacity by the data compression of a very high degree.

This invention is an improvement of the invention disclosed in the above-mentioned patent application and its primary object is to provide a method which is adapted to compress data at a very high ratio by detecting the characteristics of the contour lines of partial picture images, which are divided up from the original picture image, over the neighboring partial picture images.

According to this invention, such a technical object is accomplished by providing a method for data compression for two-value picture image, characterized by the steps of dividing the original picture image into a plurality of partial picture images, determining a start point and an end point of each contour line found in each of the partial picture images by finding the intersections between the contour line and the lines dividing the original picture image into the partial picture images, detecting characteristic points in each contour line by tracing the contour line in each of the partial picture images from the corresponding start point and end point, extracting those start points and end points which connect to those in the neighboring partial picture images and the characteristic points as necessary coordinate points for determining a group of closed-loop line segments as an aggregate of the contour lines, and further compressing the data of the original picture image by removing any redundant coordinate point data through comparison of the gradients of the closed-loop line segments for each neighboring coordinate points.

The improvement of this invention over the above-mentioned copending U.S. patent application exists in the elimination of any redundancy in the data and this may be conveniently accomplished by eliminating those coordinate points which have the same gradients as the preceding coordinate points along the contour lines.

Now this invention is described in the following in terms of a specific embodiment with reference to the appended drawings, in which:

FIG. 1 is a block diagram showing an embodiment of a device for carrying out the method of this invention for compressing the data of a two-value picture image.

The original picture pattern whose graphical data is to be compressed is photoelectrically scanned in a suitable manner and converted into a picture signal by an original picture input device 1, and the picture signal is converted into a digital signal by an A/D converter 2 and then supplied to a two-value picture image memory device 3.

Figure 2:
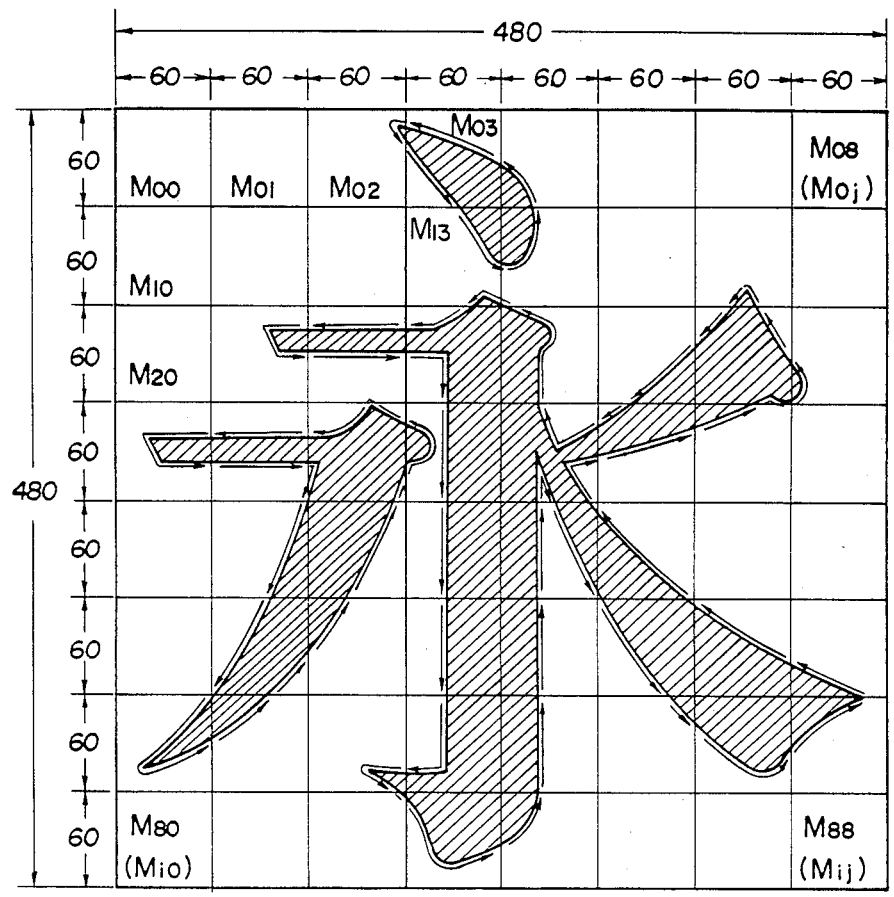
FIG. 2 is a bit pattern in the memory showing a typical original picture image whose graphic data is to be compressed.

The data of the original picture pattern stored in the two-value picture image memory device 3 is comprised of a bit pattern of a dot matrix as illustrated in FIG. 2, and the original picture pattern which expressed by the bit pattern is the two-value picture image (which is referred to as "original picture image" hereinafter) which is to be compressed according to this invention.

The two-value picture image memory device 3 is comprised of a plurality of memory blocks $M_{00} \sim M_{ij}$ arranged in a matrix, and each of the memory blocks $M_{00} \sim M_{ij}$ stores one of the i×j partial picture images divided up from the original picture image.

Then, each partial picture image is transferred from the corresponding memory block $M_{00} \sim M_{ij}$ to a partial picture image memory device, sequentially and for each memory block, according to the control command from a memory control device 5.

The memory control device 5 controls the writing, reading and addressing of data in regards to both the memory devices 3 and 4 according to the procedure given by a flow chart hereinafter.

Figure 3:
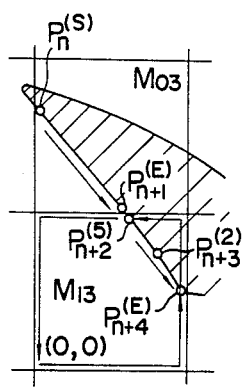
FIG. 3 shows in detail two mutually adjacent partial picture images of the original picture shown in FIG. 2 as the bit patterns stored in the corresponding memory blocks.
Figure 4:
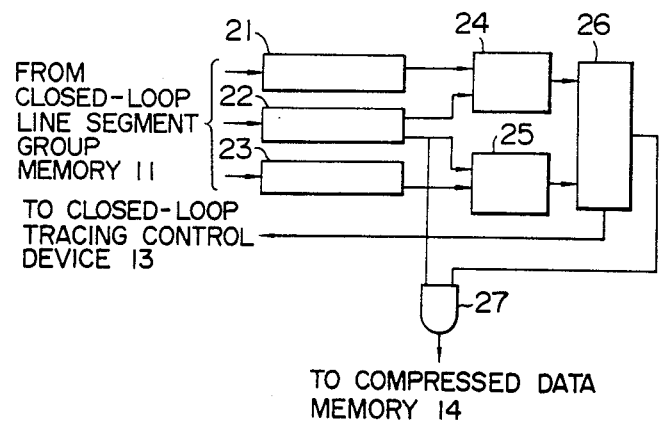
FIG. 4 is a block diagram showing a concrete structure of the gradient comparison/elimination means of FIG. 1.

FIG. 3 is a magnified view of the bit patterns of two partial picture images which have been transferred to the partial picture image memory device 4, and the ones shown in the drawing corresponds to the bit patterns of the memory block $M_{03}$ and $M_{13}$ of FIG. 2.

According to this bit pattern in the partial picture image memory device 4, the pixel bits on the intersections between the contour lines of the partial picture image and the lines dividing the pertinent partial picture image from the neighboring partial picture images as start points $P^{(S)}$ and end points $P^{(E)}$.

In other words, the outer periphery of the addresses of the partial picture image memory device is sequentially designated from the origin (0,0) in counter-clockwise direction and the changes of the pixel bits on the outer periphery of the bit pattern are determined.

In the bit pattern here, those bits in the character region are expressed by "1" while those in the background region are expressed by "0". In other words, the pixel bits on the outer periphery of the addresses in the partial picture bit pattern are sequentially read out in counterclockwise direction and the bit corresponding to "1" when the read-out bit is about to change from "1"1 to "0" is determined as a start point $P^{(S)}$ while the bit corresponding to "1" when the read out bit is about to change from "0" to "1" is determined as an end point $P^{(E)}$.

The contour line of the bit pattern generally extends on the periphery of the pixels, but, to simplify the following description, those pixels or a row of pixels having a contour line at least on one end are assumed to make up a contour line.

The coordinate values $(x_i, y_i)$ of the start point $P^{(S)}$ and the end point $P^{(E)}$ detected by a start/end point detecting means are stored in an appropriate register and supplied to a contour line tracing means 7 so that a contour line may be detected with the terminal points defined by the signal from the register.

The pixel bits on the contour line traced by the contour line tracing means 7 are given to a characteristic point detecting means 8 so that the changes in the characteristics of the contour line may be detected and appropriate number of characteristic points on the contour line may be sequentially detected.

These characteristic points may be classified, for instance, in the following manner according to the type of the changes in the contour line.

$P^{(1)}$: point at which the direction of the contour line changes abruptly $P^{(2)}$: point at which the direction of the contour line changes gradually in one direction $P^{(3)}$: point at which the contour line changes from a straight line to a curved line $P^{(4)}$: point at which the contour line changes from a curved line to a straight line The group consisting of the coordinate points obtained by sequentially tracing the coordinate points of these characteristic points from the start point $P^{(S)}$ to the end point $P^{(E)}$ are written into a line segment data memory device 9 as the compression data of the partial picture image.

Each of the coordinate points in the line segment data memory device is converted into the coordinate point of the original bit pattern according to the block number 00~ij of the memory block $M_{00}$~$M_{ij}$.

In other words, for each of the memory blocks $M_{00}$~$M_{ij}$, the characteristic points $P^{(1)}$~$p^{(4)}$ and the associated start and end points $P^{(S)}$ and $P^{(E)}$ located at respective ends of the characteristic points are written into the line segment data memory device 9, normally, in the order of the start point $P^{(S)}$, the characteristic points $P^{(1)}$~$p^{(4)}$, and the end point $P^{(E)}$ as the compressed data.

After all the compression data of the line segment data memory device 9 is collected in regards to all the memory blocks $M_{00}$~$M_{ij}$, the compression data is supplied to a data connecting means 10 for between the partial picture images so that the end point $P^{(E)}$ and the start point $P^{(S)}$, which are to be mutually connected between the contour lines which are separated one from the other as separate partial picture images are connected together and is converted into closed loop line segment data consisting as a whole of several closed loops.

Figure 5:
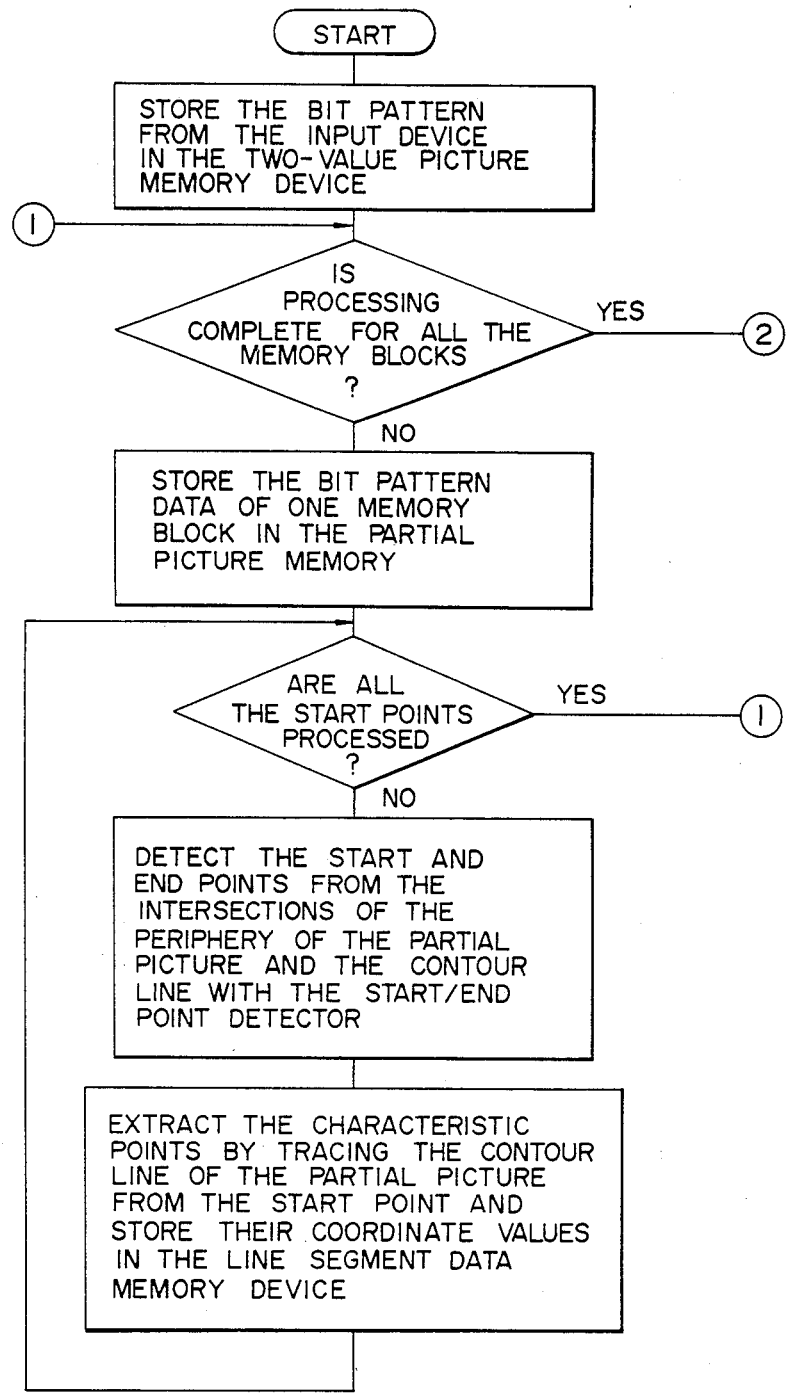
FIGS. 5 and 6 show a flow chart illustrating the action of the data compression device shown in FIG. 1.

The signal processing described thus far is identical to the one shown by the flow chart of FIG. 5 and has been already discussed in detail in previously mentioned Japanese Patent Application No. 56-180649.

Figure 1:
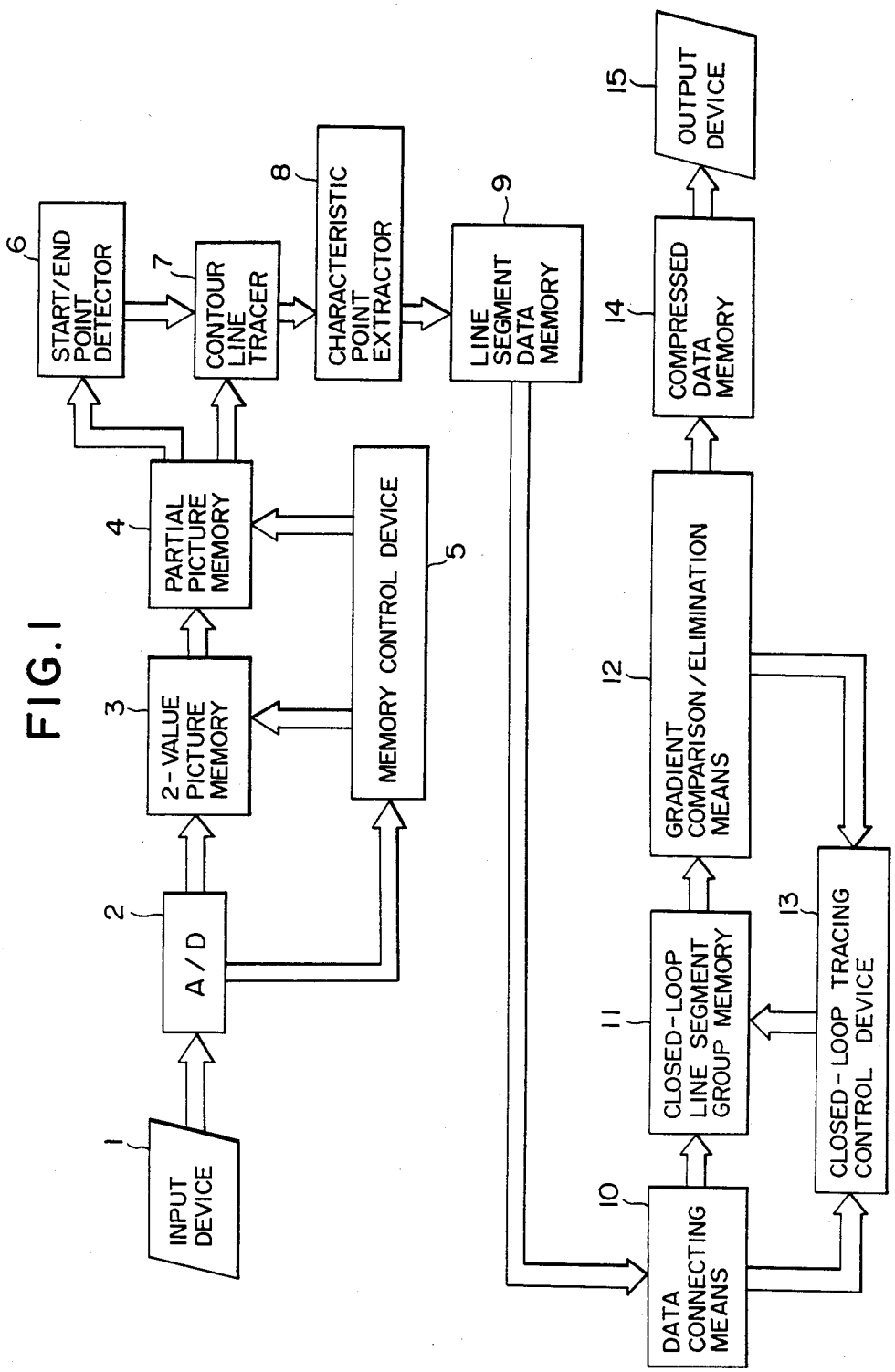
FIG. 1 is a block diagram of a device for data compression adapted to carry out the method of this invention.

The essential part of the method of data compression according to this invention is found in the connecting means 10 for between different partial picture images shown in FIG. 1 and thereafter.

At the connecting means 10 for between different partial picture images, the start point $P^{(S)}$ and the end point $P^{(E)}$ corresponding to each of the line segment data are connected together so that the contour line for the whole original picture image may be reproduced and written into a closed loop line segment group memory device 11 after being converted into a plurality of closed loop line segments.

The original picture pattern and the contour line of its bit pattern are each comprised of a closed loop as shown by an example given in FIG. 2.

Each closed-loop line segment data is then supplied to a gradient comparison/elimination means 12 so that the gradients of the pixel bits lying on the lines defining the partial picture images and the contour lines with respect to the neighboring coordinate points are detected and those pixel points having the same gradients ahead and behind are eliminated from the coordinate point data.

Specifically, the gradient comparison/elimination means 12 may be comprised of, for instance, three data buffer memories 21, 22 and 23, two gradient computing circuits 24 and 25, a comparison circuit 26 and a gate circuit 27.

The coordinate point data of a certain closed loop line segment group is sequentially stored in the data buffer memories 21, 22 and 23 as coordinate points $P_n$, $P_{n+1}$, $P_{n+2}$, . . . from the memory device 11 for the closed loop line segment group under the control command from a closed-loop tracing control circuit 13.

The data buffer memories 21 and 22 are connected to the gradient computing circuit 24 and the data buffer memories 22 and 23 are connected to the gradient computing circuit 25. And the gradient between the coordinate points $P_n$ and $P_{n+1}$ is computed at the gradient computing circuit 24 while the gradient between the coordinate points $P_{n+1}$ and $P_{n+2}$ is computed at the gradient computing circuit 25 so that the gradients thus obtained are supplied to the comparison circuit 26.

When the gradients of $\overline{P_n P_{n+1}}$ and $\overline{P_{n+1} P_{n+2}}$ are not in agreement, the output of the comparios circuit 26 is supplied to the gate circuit 27 and the output data of the data buffer memory 22 storing the coordinate point $P_{n+1}$ is sent to the compressed data memory device 14.

Conversely, when the gradients of $\overline{P_n P_{n+1}}$ and $\overline{P_{n+1} P_{n+2}}$ are in agreement, the data corresponding to the coordinate point $P_{n+1}$ is not supplied to the compressed data memory device 14.

For instance, the processing in the gradient comparison/elimination means 12 in regards to the data $P_n^{(S)}$, $P_{n+1}^{(G)}$, $P_{n+2}^{(S)}$, $P_{n+3}^{(2)}$, $P_{n+4}^{(E)}$, . . . of the closed loop line segment group over the memory blocks $M_{03}$ and $M_{13}$ is carried out as set out in the following and the data sequence that is produced will be likewise as set out in the following.

(1) The gradients $Y_{n+1}-Y_n/X_{n+1}-X_n$ between the coodinate points $P_n(X_n, Y_n)$ and $P_{n+1}(X_{n+1}, Y_{n+1})$ and the gradient $Y_{n+2}-Y_{n+1}/X_{n+2}-X_{n+1}$ between the coordinate points $P_{n+1}(X_{n+1}, Y_{n+1})$ and $P_{n+2}(X_{n+2}, Y_{n+2})$ are compared one with the other.

(2) When the coordinate points $P_n$, $P_{n+1}$ and $P_{n+2}$ are detected to be on a same line, the data $P_{n+1}^{(E)}$ corresponding to the coordinate point $P_{n+1}(X_{n+1}, Y_{n+1})$ is blocked by the gate circuit 27 and is not produced.

(3) The coordinate points in the data buffer memories 21, 22 and 23 are renewed and $P_{n+1}(X_{n+1}, Y_{n+1})$, $P_{n+2}(X_{n+2}, Y_{n+2})$ and $P_{n+3}(X_{n+3}, Y_{n+3})$ are stored followed by the comparison of the gradients between $P_{n+2}$ and $P_{n+3}$ and between $P_{n+3}$ and $P_{n+4}$.

(4) When $P_{n+1}$, $P_{n+2}$ and $P_{n+3}$ are detected to be on a same line, the coordinate points $P_{n+2}(x_{n+2}, y_{n+2})$ is not output.

(5) The coordinate points in the data buffer memories 21, 22 and 23 are renewed and
$P_{n+2}(x_{n+2}, y_{n+2})$, $P_{n+3}(x_{n+3}, y_{n+3})$ and $P_{n+4}(x_{n+4}, y_{n+4})$ are stored followed by the comparison of the gradients between $P_{n+2}$ and $P_{n+3}$ and between $P_{n+3}$ and $P_{n+4}$ (6) When $P_{n+2}$, $P_{n+3}$ and $P_{n+4}$ are detected to be not on a same line, then the coordinate point $P_{n+3}(x_{n+3}, y_{n+3})$ is output.

(7) This procedure is repeated over and over again for all the coordinate points in the closed loop line segment group and the coordinate point data of the pixel bits which divide the memory blocks $M_{03}$ and $M_{13}$ in the form of ... $P_n$, $P_{n+3}$, $P_{n+4}$ ... are eliminated from the memory at the compressed data memory device 14 for a two-value picture image.

Figure 6:
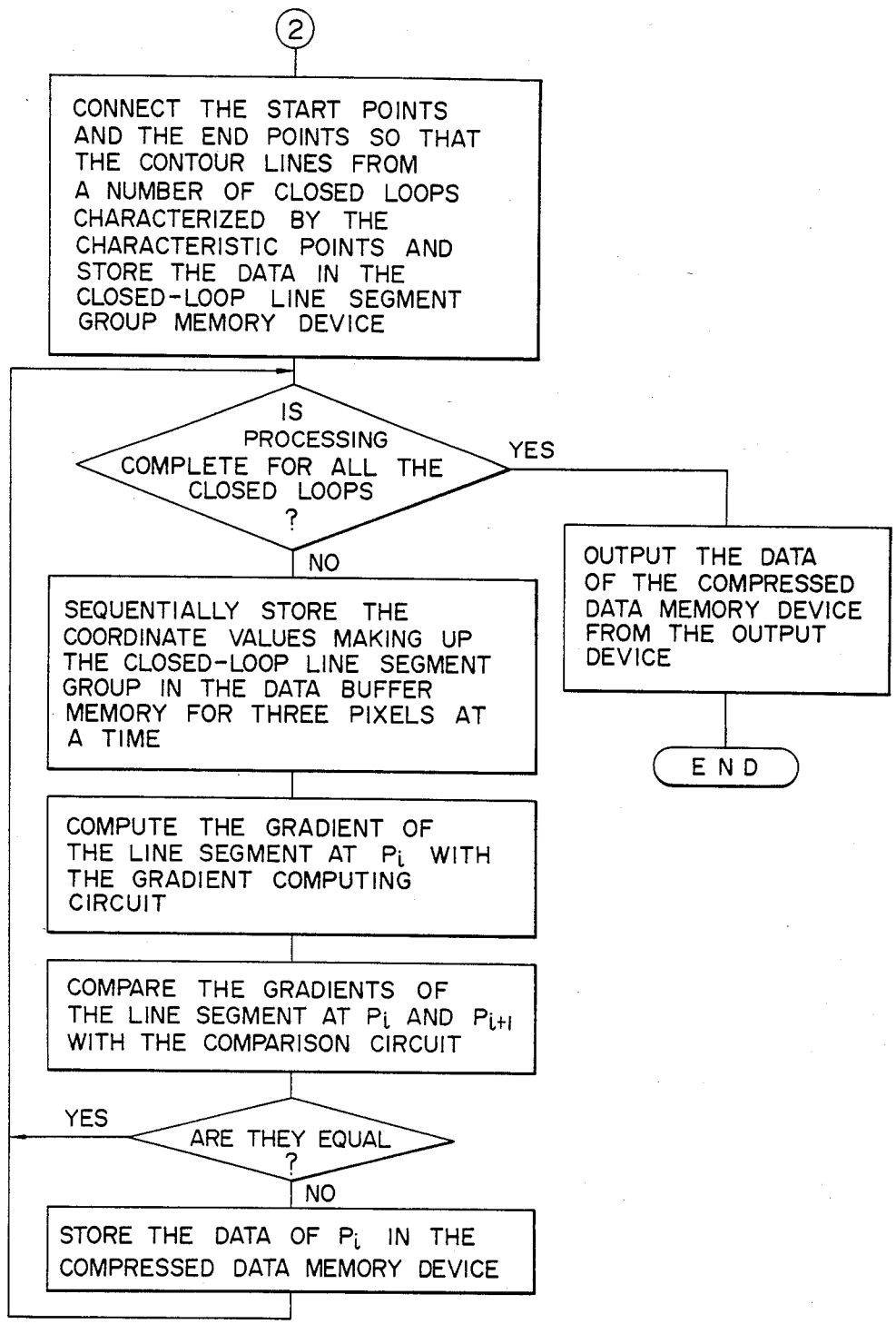

The compressed data in which redundant coordinate point data is eliminated is sequentially stored in the compressed data memory device 14 for a two-value picture image for each of the closed loops in the original picture pattern and is subsequently supplied into the output device 15 at appropriate timing. FIG. 6 shows a flowchart of the above-described processing procedure.

When the direction of the tracing of this closed-loop contour line is counter-clockwise, the interior of the loop (contour line) is determined as black (character portion) and, when the tracing direction is clockwise, the interior of the loop is determined as white (blank portion). If the loop is multiple or has another loop therein, the inner loop has the priority.

As described above, according to this invention, redundant coordinate point data is eliminated from an original picture which is finely divided into a plurality of partial picture images by detecting the gradient of the contour line crossing over into a neighboring partial picture image so that compressed data of the original picture image may be obtained. Therefore, the memory capacity required for filing may be drastically reduced.

Although the invention was described in terms of a specific embodiment, it is obvious to a person skilled in the art that various modifications and alterations may be made thereto without departing from the spirit of this invention.

What is claimed is:

1. Method for data compression for two-value picture image, characterized by the steps of:

dividing an original picture image into a plurality of partial picture images;

determining a start point and an end point of each contour line found in each of the partial picture images by finding the intersections between the contour line and the lines dividing the original picture image into the partial picture images;

detecting characteristic points in each contour line by tracing the contour line in each of the partial picture images from the corresponding start point and end point;

extracting those start points and end points which connect to those in the neighboring partial picture images and the characteristic points as necessary coordinate points for determining a group of closed-loop line segments as an aggregate of the contour lines; and further compressing the data of the original picture image by removing any redundant coordinate point data through comparison of the gradients of the closed-loop line segments for each neighboring coordinate point pairs on the particular contour line.

2. Method as defined in claim 1, wherein each characteristic point of the contour lines is selected on the basis of the directions of two vectors of the coordinate points adjacent to the particular coordinate point of interest along the particular contour line, the coordinate points corresponding to the locations of the pixel bits along the contour line.

3. Method as defined in claim 2, wherein the redundant coordinate point data is comprised of those coordinate points which have the same gradients to the preceding coordinate points along the contour lines.

* * * * *